United States Patent
Swift et al.

(10) Patent No.: US 9,607,019 B1
(45) Date of Patent: Mar. 28, 2017

(54) SPLITTING DATABASE PARTITIONS

(71) Applicant: Amazon Technologies, Inc., Reno, NV (US)

(72) Inventors: Bjorn Patrick Swift, Seattle, WA (US); Maximiliano Maccanti, Bellevue, WA (US); Stefano Stefani, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 435 days.

(21) Appl. No.: 13/838,298

(22) Filed: Mar. 15, 2013

Related U.S. Application Data (60) Provisional application No. 61/753,905, filed on Jan. 17, 2013.

(51) Int. Cl.
*G06F 17/30* (2006.01)
(52) U.S. Cl.
CPC .................. *G06F 17/303* (2013.01)
(58) Field of Classification Search
CPC ........... G06F 11/1464; G06F 17/30067; G06F 17/30073; G06F 17/3002
USPC ........................ 707/651, 652, 653
See application file for complete search history.

(56) References Cited

U.S. PATENT DOCUMENTS

| | | | |
|---|---|---|---|
| 6,778,977 B1* | 8/2004 | Avadhanam | G06F 17/30327 707/737 |
| 2007/0040094 A1* | 2/2007 | Smith et al. | 250/202 |
| 2008/0065672 A1* | 3/2008 | Bamford | G06F 17/30327 |
| 2013/0159659 A1* | 6/2013 | Gelman | G06F 17/30584 711/173 |
| 2013/0166557 A1* | 6/2013 | Fricke et al. | 707/737 |

\* cited by examiner

*Primary Examiner* — Rehana Perveen
*Assistant Examiner* — Loc Tran
(74) *Attorney, Agent, or Firm* — Baker & Hostetler LLP (57) ABSTRACT

Techniques are disclosed for splitting a database partition into two partitions. In embodiments, where the partition is a hash partition, the partition is split at its logical midpoint, so that half of the partition's rows are placed in each split partition. Where the partition is a hash-range partition, a number of rows of the partition are sampled. Where enough samples fall on each side of the logical midpoint, the logical midpoint is again used as the split point. Where not enough samples fall on one side of the logical midpoint, then the median of the samples is used as the split point.

27 Claims, 5 Drawing Sheets

| customer-value 304 | hash 302 | range 306 |
|---|---|---|
| bjorn | 3 | a |
| bjorn | 3 | b |
| john | 18 | c |
| john | 18 | d |
| john | 18 | e |
| john | 18 | f |
| john | 18 | g |
| john | 18 | h |
| john | 18 | i |
| john | 18 | j |
| john | 18 | g |
| john | 18 | u |
| john | 18 | b |
| john | 18 | d |
| paul | 80 | e |
| paul | 80 | f |
| paul | 80 | d |
| paul | 80 | u |
| paul | 80 | t |

FIG. 3

| customer-value 304 | hash 302 | range 306 |
|---|---|---|
| bjorn | 3 | a |
| bjorn | 3 | b |
| john | 18 | c |
| john | 18 | d |
| john | 18 | e |
| john | 18 | f |
| john | 18 | g |
| john | 18 | h |
| john | 18 | i |
| john | 18 | j |
| john | 18 | g |
| john | 18 | u |
| john | 18 | b |
| john | 18 | d |
| paul | 80 | e |
| paul | 80 | f |
| paul | 80 | d |
| paul | 80 | u |
| paul | 80 | t |

FIG. 4

| customer-value 304 | hash 302 | range 306 |
|---|---|---|
| bjorn | 3 | a |
| bjorn | 3 | b |
| john | 18 | c |
| john | 18 | d |
| john | 18 | e |
| john | 18 | f |
| john | 18 | g |
| john | 18 | h |
| john | 18 | i |
| john | 18 | j |
| john | 18 | g |
| john | 18 | u |
| john | 18 | b |
| john | 18 | d |
| paul | 80 | e |
| paul | 80 | f |
| paul | 80 | d |
| paul | 80 | u |
| paul | 80 | t |

FIG. 5

SPLITTING DATABASE PARTITIONS

CROSS REFERENCE TO RELATED APPLICATIONS

This application claims the benefit under 35 U.S.C §119 (e) of U.S. Provisional Application No. 61/753,905 filed Jan. 17, 2013 which is hereby incorporated by reference in its entirety.

BACKGROUND

Data centers provide computing resources for use by one or more clients. These services may include computing, storage and networking services. For example, a data center may provide a machine to host an application, storage to store application data, cache to quickly respond to repeated data requests and networking to enable communication between resources. By making use of the data center services, a customer may pay for computing and/or resource use rather than purchasing anticipated hardware needs. This enables a customer to expand and contract use of computing services according to demand. For example, an application may be configured to request more storage as needed rather than a developer or administrator monitoring and anticipating use.

On demand systems may be used to reduce the number of times a database must be read or written to. For example, one implementation uses a client centered architecture where a client (a client of a database system, rather than an end-user client) knows the servers, but the servers are not known to each other. To read or set a key, the client uses a hash to determine which server to contact and contacts that server. The server then calculates a second hash to determine where to store or read the corresponding value. Additions or subtractions to the group of servers are managed by the client.

BRIEF DESCRIPTION OF THE DRAWINGS

Various embodiments in accordance with the present disclosure will be described with reference to the drawings, in which.

DETAILED DESCRIPTION

In database systems, a customer may be permitted to create database tables, which may be scaled for the customer based on a variety of metrics, including throughput and data size. For instance, when the customer desires to use more throughput or a larger database than is to be implemented on a single server, the database partition may be split, and these two resulting split partitions may each be placed on separate computing nodes. Where a database table is partitioned (sometimes referred to herein as partitioning a database), that indicates that one portion of a database (referred to herein as a partition) is stored on one computer, and that another portion of the database is stored on another computer. This may be extended beyond two computers such that a single distributed database is split over many computers. Then, these multiple computers work in concert to respond to customer queries. For instance, where a query requests an identification of the total number of rows in the distributed database, and no computer in the distributed database stores all of the rows, a computer in the distributed database may query the other computers in the distributed database for the number of rows that they are storing, receive from each other computer an indication of the number of rows that it is storing, and then sum all of these numbers to determine the total number of rows in the database, which it may return to the customer as a response to the query.

Partitioning may limit the usage of one or more computing resources of a computing device such that the usage of the computing resource is kept below a threshold amount. From the customer's perspective, the customer should be able to use a large amount of throughput, CPU usage, storage space, power, and maintain limits on latency, heat, speed, power, consumption, and/or data without worrying about how to set up partitioning the database. A solution then is to automatically and split tables into partitions by determining an appropriate split point for a partition—a point in a single partition at which the rows before that split point go into one partition and the rows following that split point go into another partition.

In embodiments, it may be that choosing a logical split point (which may be a median of a range over which hash and range value pairs span in a database partition—e.g., if the smallest hash and range value may be expressed with one number as 2 and the largest hash and range value may be expressed with one number as 4, then this median is 3) for a hash-range partition is selected over sampling and splitting at the median of the samples (this may be a median value where half of the number of samples are above the median value and half of the number of samples are below the value). As used herein, a hash-range partition may indicate a partition where both a hash value and a range value (sometimes referred to as a hash and range value pair) are used as a key to a database. A first division may be made based on a hash value, and a second division may be made on a range value. Thus, a hash value may serve as a major key and a range value may serve as a minor key to a database.

An example of a reason for selecting a logical split point over a median of samples is that, when there is a slight skew in the partition's current data distribution, the distribution is likely to even out over time. If the distribution does even out, then the mathematical/logical split may provide for a more even distribution between split partitions over time. In view of this reason, using the median of the samples may then be a fallback when data distribution within a partition is skewed to the point where it is likely to not distribute evenly between the split partitions, or there may be a need to make special arrangements to properly split the partition.

Another reason for choosing a logical split point over a median of samples is that it may be advantageous to not split ranges of data that are related in some way (such as by sharing a common hash value for access; these ranges of data may be referred to as ranges herein)—certain range collections to a single partition. When the database accepts queries that allow a call to return all items in the range for a particular customer value (e.g., "return all items in the range under John"), being able to serve those calls without crossing partition boundaries may result in performance improvement. Where a partition is not split over ranges, then each row for a corresponding customer value is found within one partition (where the customer value is hashed to produce a hash key), so these calls may be responded to by querying a single partition.

In embodiments, partitioning generally occurs without user interaction—the user does not need to worry about the partitioning, and there is no, or essentially no, loss of performance during partition splits. In contrast, other database implementations have a replication penalty involved with partition splits, which may be severe in a consistent hash system.

Turning now to particular embodiments, a consistent hashing algorithm may be used to distribute keys among the partitions of a distributed database and form a key space based on the configuration received. The database may be a distributed database where portions of a single database table are stored separately among a plurality of computers which then act in concert to respond to queries made to this database. In embodiments, a distributed database may be partitioned horizontally, where an entire row of a database is stored in one computer/node, but multiple rows within the same database table may be stored in separate computers within the distributed database. In other embodiments, a distributed database may be partitioned vertically, where an entire column of a database is stored in one computer/node, but multiple columns within the same database table may be stored in separate computers within the distributed database. An embodiment described herein involves the use of a horizontally-partitioned database, but it may be appreciated that these techniques described herein may be applied to a vertically-partitioned database, as well. As used herein, a row of a database represents a single set of related data within a table—e.g., for one customer, a single row may contain that customer's name, that customer's email address, that customer's account identifier, and that customer's date of most recently ordering a product from an online store. Additionally, as used herein, a column of a database represents a set of data values that have a consistent logical relationship, such as sharing the same type—e.g., each customer's name, each customer's email address, each customer's account identifier, or each customer's date of most recently ordering a product from the online store.

In one embodiment, a partition of a distributed database is assigned one or more angles or points along a circle. The assignment of angles or points along the circle may be determined by multiple factors, including size of the partition of a database, frequency of requests for keys in the assigned portion of the key space and other factors. A hashing algorithm may be used to determine where a key falls along the circle. The point or angle where the key falls may then be traced in a predefined direction (e.g., clockwise or counterclockwise) around the circle until a first partition of a distributed database assignment is encountered. The first partition of a database assignment encountered determines which partition of a distributed database services the key. By using a consistent hashing algorithm, if each partition is allowed to service multiple points or angles, a load of a lost partition of a distributed database may be distributed among multiple remaining partitions of a distributed database if each assigned point or angle of a lost partition of a distributed database is followed by an assignment of a different partition of a distributed database. In some embodiments, divisions of the circle may be pre-computed to associate partitions of a distributed database with certain arcs of the circle. With replication, multiple partitions of a distributed database may be assigned one or more portions of a circle arc. For example, new partitions added to the database may be given one or more assignments of the available key space. This assignment may include replicating a portion of a key space assigned to another partition of a database. The new partition may then be added to a configuration and sent to be stored in some or all of the partitions of a distributed database. In some embodiments, a client driver determines which replicate of stored data to request. In one example, any partition of a distributed database assigned replicated data may be used. In other embodiments, a preferred partition of a distributed database assigned replicated data may be used. In one embodiment, an algorithmic choice, such as round-robin or random, may be used to select which partition of a distributed database to use to access the replicated data.

Figure 1:
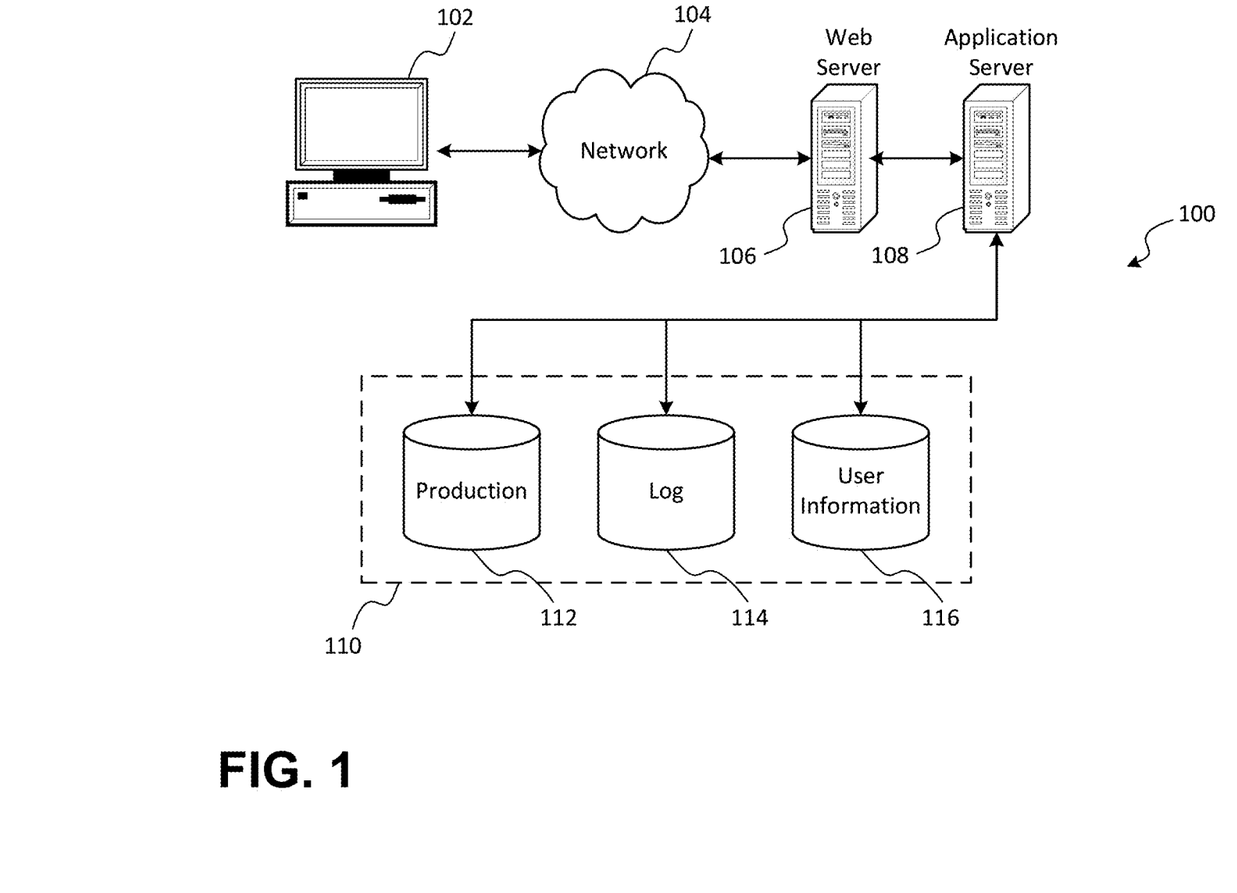
FIG. 1 depicts an environment in which various embodiments can be implemented.
Figure 3:
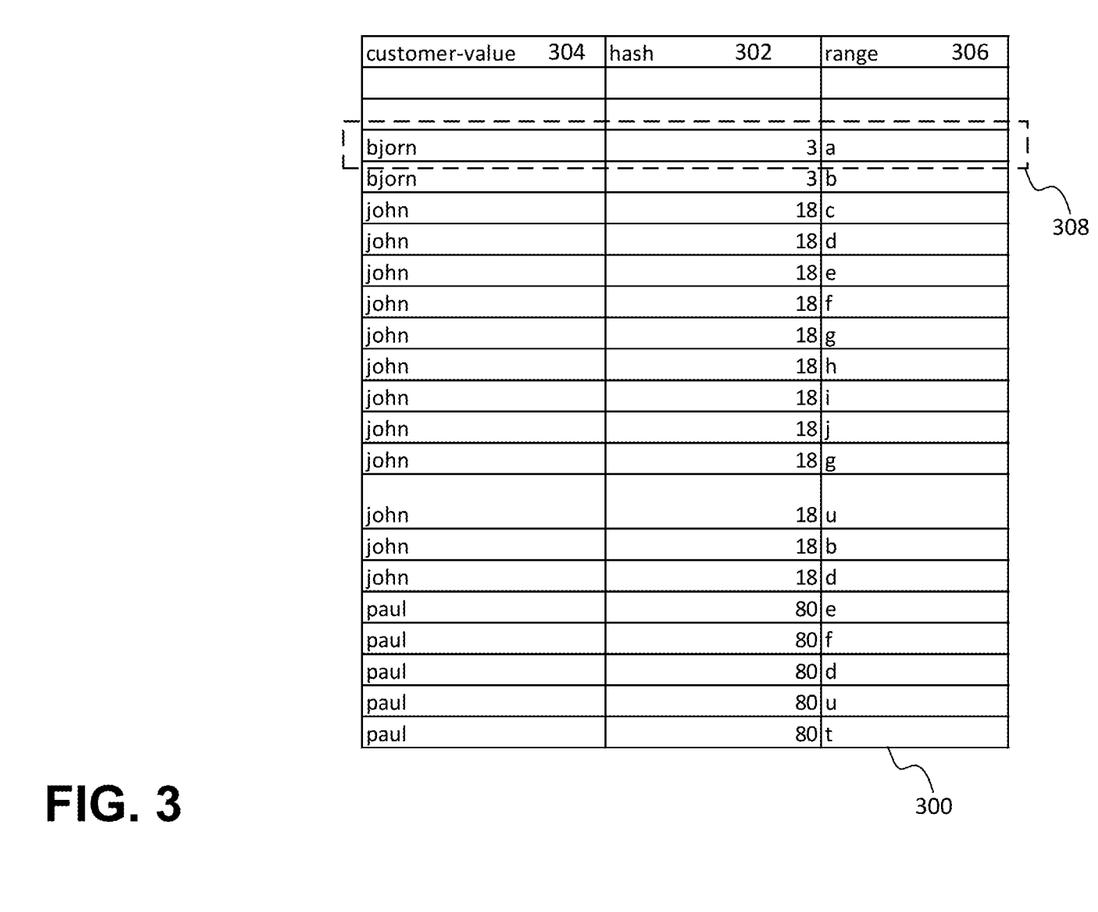
FIG. 3 depicts an example of logically splitting a partition at its midpoint.
Figure 4:
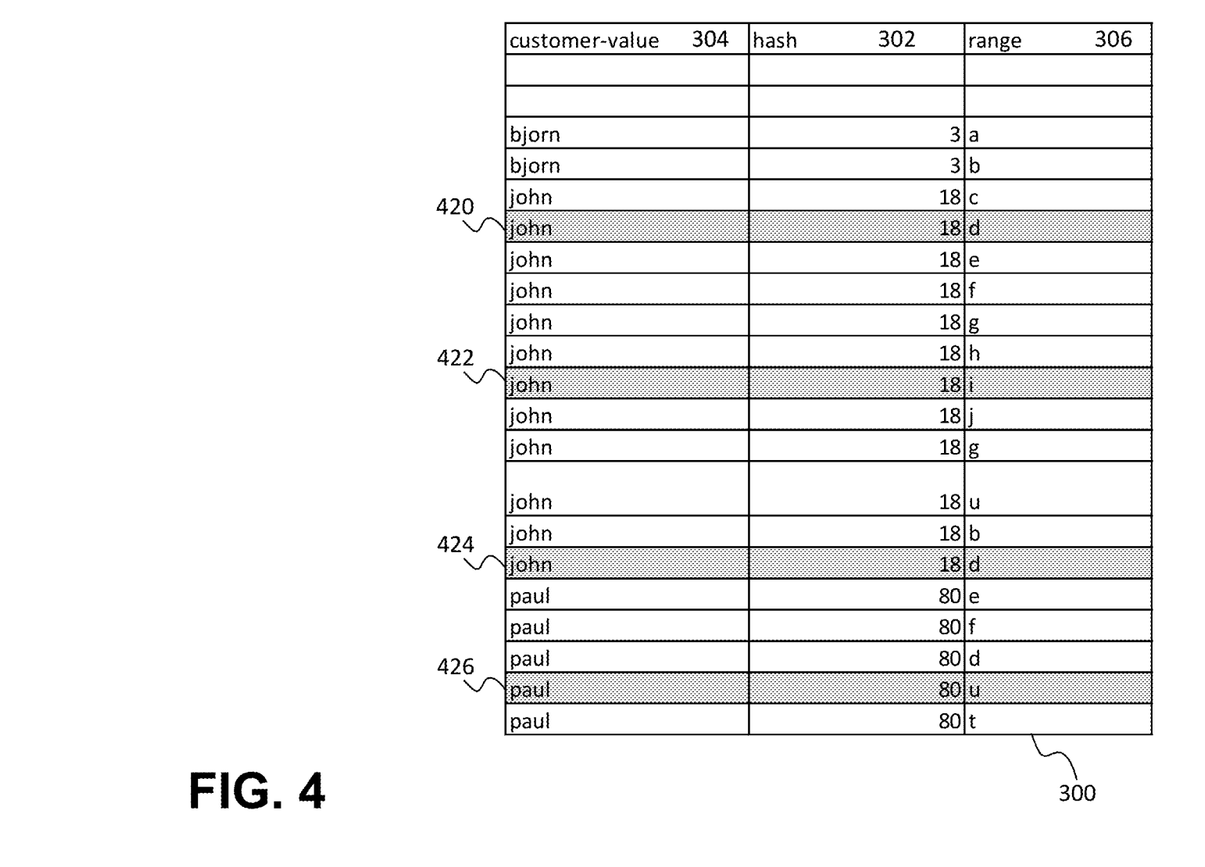
FIG. 4 depicts an example of sampling a hash-range partition.
Figure 5:
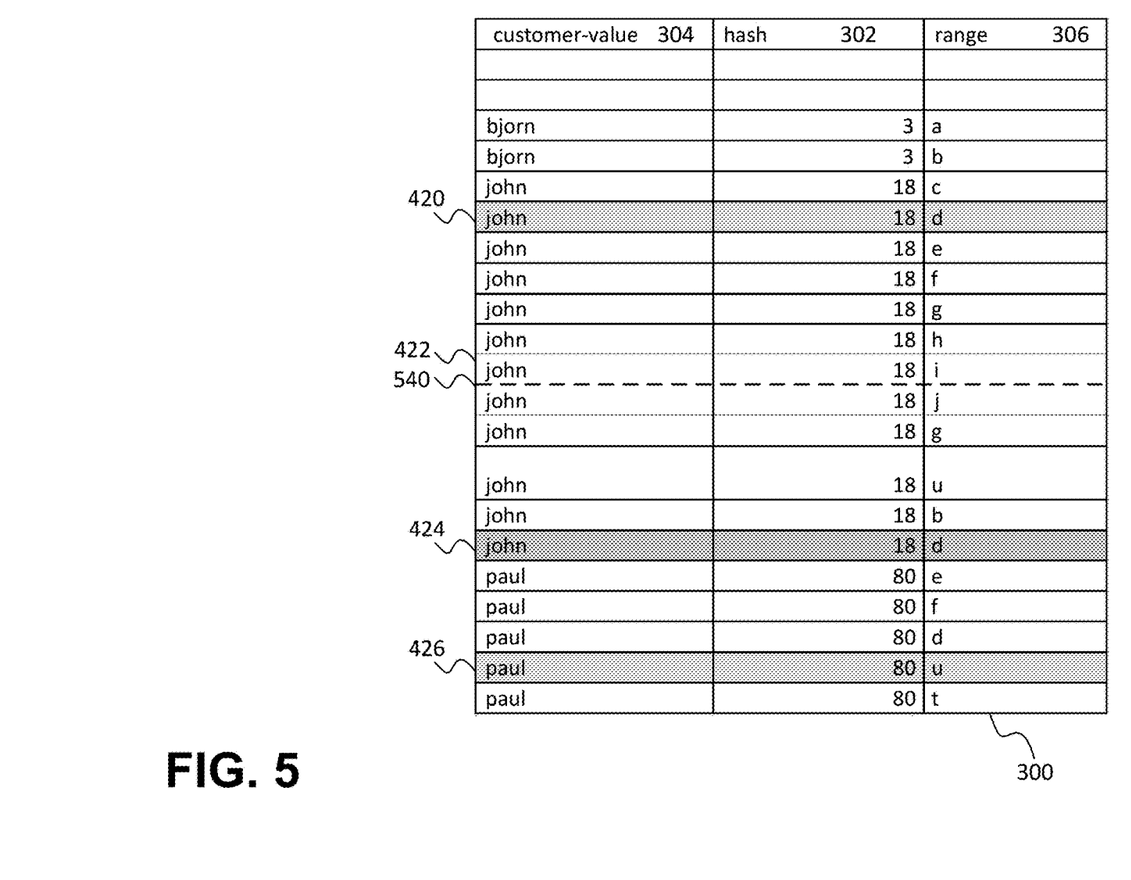
FIG. 5 depicts an example of splitting a partition at the median of its sampled points.

FIG. 1 illustrates aspects of an example environment 100 for implementing aspects in accordance with various embodiments. For instance, the example environment 100 may be used to implement the operating procedures of FIG. 2 to effectuate a database partition split as shown in FIGS. 3, 4, and 5. As will be appreciated, although a Web-based environment is used for purposes of explanation, different environments may be used, as appropriate, to implement various embodiments. The environment includes a client device 102, which can include any appropriate device operable to send and receive requests, messages or information over an appropriate network 104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment depicted in FIG. 1 includes at least one application server 108 and a data store 110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein.

The data store 110 can include several separate data tables, databases or other data storage mechanisms and media for storing data relating to a particular aspect. For example, the data store illustrated includes mechanisms for storing production data (depicted as production data store 112) and user information (depicted as user information store 116), which can be used to serve content for the production side. The data store also is shown to include a mechanism for storing log data (depicted as log data store 114), which can be used for reporting, analysis or other such purposes. The data store may comprise a distributed database where partitions of the distributed database are stored among a plurality of computers. It should be understood that there can be many other aspects that may need to be stored in the data store, such as for page image information and to access right information, which can be stored in any of the above listed mechanisms as appropriate or in additional mechanisms in the data store 110. The data store 110 is operable, through logic associated therewith, to receive instructions from the application server 108 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the client device 102. Information for a particular item of interest can be viewed in a dedicated page or window of the browser.

Each server typically will include an operating system that provides executable program instructions for the general administration and operation of that server, and typically will include a non-transitory computer-readable medium (e.g., a hard disk, random access memory, read only memory, etc.) bearing computer-executable instructions that, when executed by at least one processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
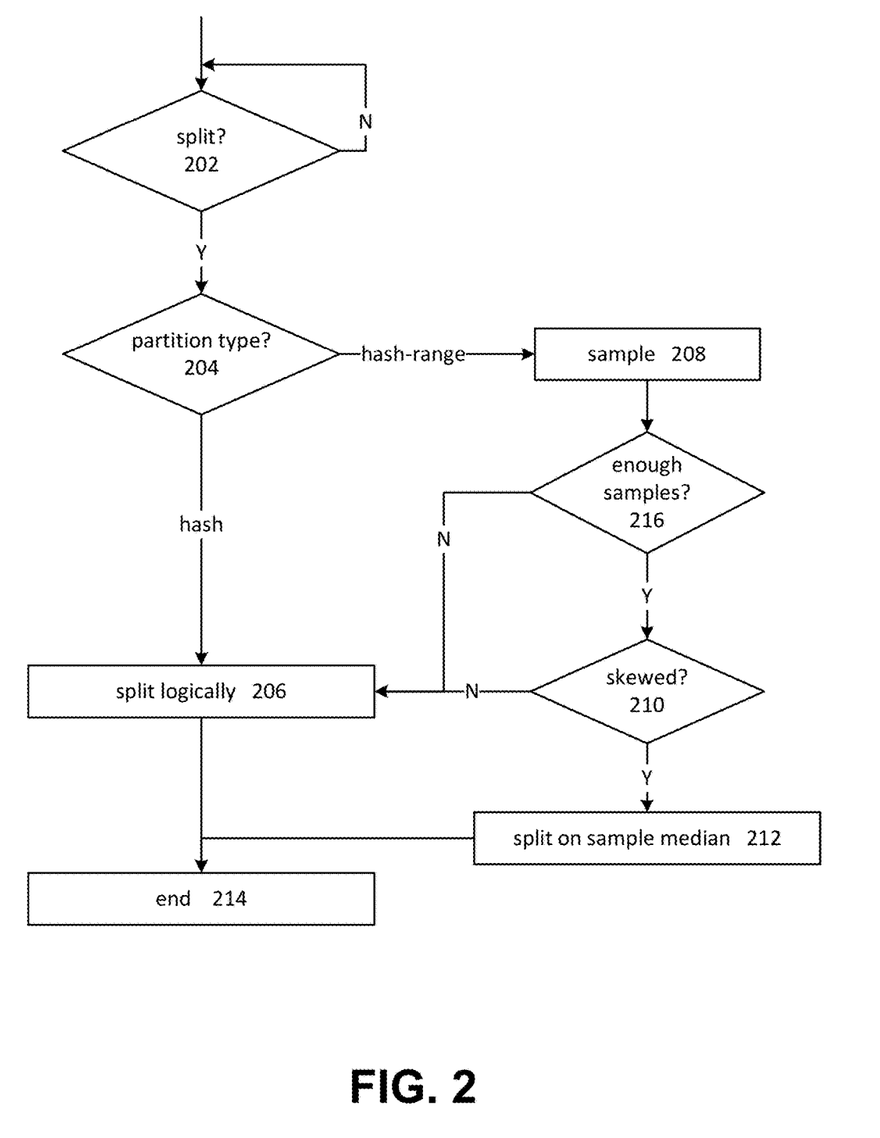
FIG. 2 depicts an example operating procedures for splitting a partition in accordance with at least one embodiment.

FIG. 2 depicts an example operating procedures for splitting a partition in accordance with at least one embodiment. For example, the operating procedures of FIG. 2 may be used by application server 108 of FIG. 1 to split partitions within production data store 112, log data store 114, or user information store 116 of FIG. 1, where data store 110 comprises a distributed database. The operating procedures of FIG. 2 may be implemented by a computing device that is configured to operate on both hash database partitions and hash-range database partitions, and implement certain operations based on whether the current database to be operated on is a hash database partition, or a hash-range database partition.

At a high level, and in certain embodiments, the operations of FIG. 2 may be laid out as follows. First, it is determined that a split is to be made for a particular partition. Where it is determined that a split is to be made for a particular partition, then the type of the partition is determined. Where the type of the partition to be split is a hash partition, then the hash partition is split at its logical midpoint—such that half the rows of the partition are split into one split partition and the other half of the rows are split into another split partition. Where the type of the partition to be split is a hash-range partition, then additional determinations are made to determine how to split the partition. A subset of rows of the partition are randomly sampled (to produce a sampling of hash and range value pairs, a hash-range partition using the result of a hash function and a range to determine in which partition of a plurality of database partitions a value is to be stored). Where these sampled rows are evenly distributed (within an allowed tolerance) on either side of the logical midpoint, then the logical midpoint is used just as in the case where the partition is a hash partition. Where these sampled rows are not evenly distributed within the allowed tolerance, then the median of these sampled rows is used as the split point for the partition, and the partition is split at this median of these sampled rows.

Operation 202 depicts determining whether a partition is to be split, which may be performed because an attribute is above a threshold. For instance, the attribute may be IOPS or partition size, and then reasons for splitting a partition may include a split for I/O operations per second (IOPS) (where a rate of operations is above a predetermined rate of operations, or a threshold rate of operations is being performed), a split for space (where a size of the database partition is above a predetermined size), a split for CPU usage, a split to maintain one or more user requirements or service level agreements, such as an agreement for a limit to latency, database 'heat', power, CPU usage, reserved capacity, bursting, or a metric related to any other computing resource. A split for IOPS may occur in response to a user increasing his throughput so that the partitions are raised above an allowed partition maximum. A split for space may occur when a partition grows above a space limit. Another reason to split a partition may more directly deal with system performance. For example a partition may be split when it has an associated computer that is experiencing CPU load above a threshold, or when an average time to respond to a query is above a threshold.

In other embodiments, splits may be based on customer requests. For instance, a customer may indicate the IOPS and space limits at which point a split should be made. Additionally, a customer may issue an API call from a remote client as a web service request to specifically indicate that a particular partition is to be split immediately, or at some future time. Such an API call may be made as a web service request via Hypertext Transfer Protocol—HTTP—or Hypertext Transfer Protocol Secure—HTTPS—where the client uses a Uniform Resource Locator—URL—(that may be determined as a result of user input provided to the client) to indicate the web server or group of web servers to direct the API call to in the hostname portion of the URL and the command to be implemented by that server or group of servers in the query string of the URL—the part of a URL that comes after a "?" In other embodiments, a customer may use a command-line tool to establish a remote shell session with the server or servers, and implement a command to perform a split at a particular time via the command line. In other embodiments, a REST API (Representational state transfer) or SOAP API (Simple Object Access Protocol) may be used by a customer to indicate to split a partition. If it is determined that a given partition is to be split, the process flow moves to operation 204. If it is determined that a given partition is not to be split, then the process flow remains at operation 202, where the process flow may wait until such a time as the given partition is to be split, or determine whether another partition is to be split.

Operation 204 depicts determining the type of the partition to be split. As depicted, there are two partition types, though there may be embodiments where there are additional partition types. A partition may be a hash partition where a hash function is used to determine in which partition a given value or entry is to be stored. A partition may also be a hash-range partition where the combination of a hash function as well as range indicating, e.g., a time at which the entry is being stored is used to determine in which partition a given value or entry is to be stored. In this sense, a row is assigned to a partition based first on its hash value, and then within its hash value based on its range value. For instance, a row with a hash value of 5 and a range value of 10 would come before row with a hash value of 6 and a range value of 4, and that second row would come before a row with a hash value of 6 and a range value of 9. In this sense, the hash value and range may be thought of as collectively representing a number, with the hash value representing the integers to the left of a decimal place, and the range value representing the decimals to the right of the decimal place. Where the type of the partition to be split is a hash partition (one where rows are assigned to a partition based only on a hash value), then the process flow moves to operation 206. Where the type of the partition to be split is a hash-range partition (one where rows are organized based first on a hash value, and then within the hash value, on a range value), then the process flow moves to operation 208.

Operation 206 depicts splitting the partition logically. This may comprise copying at least one row from the partition to another partition, based on the split point (which here is the median value of a range over which hash—and possibly range, depending on the partition type—values span in the partition). In a logical split, the mathematical midpoint is the split point. For example, if the partition's keyspace range is [0,600), then the split point is 300 (because 300 is halfway between 0 and 600), and the two resulting partitions have respective keyspace ranges of [0,300) and [300,600). As used herein when discussing a range, a bracket adjoining a number means that the range includes that number, and a parenthesis adjoining a number means that the range includes all numbers greater than or less than that number (depending on whether the number in question represents the lower bound or upper bound of the range). So, [0,600) indicates a range starting with and including zero, which extends up to but does not include 600. It may not be possible to split a partition so that each split partition is exactly the same size. If there are an even number of rows in the partition, it is possible to split the partition into two equal-sized rows (e.g., if there are 400 rows in the partition, then each split partition may contain 100 rows). However, if there are an odd number of rows in the partition, then the most equal that the two split partitions may be with respect to number of rows is where one split partition has one more row than the other split partition (e.g., if there are 401 rows in the partition, then one split partition may contain 100 rows, and the other split partition may contain 101 rows). Where there are an odd number of rows in the partition, then in some embodiments, the split partition before the split point may be assigned the extra row, so that it contains one more row than the split partition after the split point. In other embodiments, the split partition after the split point may be assigned the extra row, so that it contains one more row than the split partition before the split point. A logical split may also be expressed as using a split point based on a logical median of a set of values over which key values of a partition may span (e.g., the possible hash values of a hash partition).

In embodiments, a partition may be split by creating two new partitions. Rows on one side of the split point may be copied to one of these new partitions, and rows on the other side of the split point may be copied to another of these partitions. For example, where a partition with range [0,600) is split into two partitions that range from [0,300) and [300,600), respectively, rows with a key in [0,300) may be copied to one of the new partitions, and rows with a key in [300,600) may be copied to the other of the new partitions. With 300 being the split point, this may sometimes be referred to as the rows above the split point being copied to one partition and the rows below the split point being copied to another partition (with 300 being the median of the values that the keys to this partition may range over). Then, the two new partitions may be tested to verify that they operate properly, and where they do, the original partition may be deleted, or otherwise taken out of operation.

In other embodiments, the rows on one side of a split point (either above or below) may be kept on the original partition, and the rows on the other side of the split point may be copied to a new partition. This has the effect of splitting a partition using itself and only one other partition. After operation 206, the process flow moves to operation 214, where the process flow ends.

Operation 208 follows where it is determined in operation 204 that the partition type is a hash-range partition. In operation 208, a sample of the entries in the partition are taken. In embodiments, this comprises obtaining a set of samples of hash and range value pairs for a plurality of rows of the first database partition. Sampling the partition may involve, for instance, scanning an index of a table in the partition or the table in the partition itself. A row may be read, and then the scanning operation may advance a random number of rows forward before reading another row. In embodiments, there are fewer rows than there are samples to take. In such embodiments, the rows may be sampled, even though the combined number of those rows is not as large as the desired number of samples to be taken. After operation 208, the process flow moves to operation 216.

In operation 216, it is determined if a threshold number of samples was taken. It may be that there is some minimum number of samples for the collective samples to be useful. For example, a relatively small number of samples may be relatively unlikely to represent the set of rows in the partition as a whole, and therefore should not be used. In embodiments, this minimum threshold may be set at between 4,000 and 16,000 samples. In some embodiments, there are both a desired number of samples and a minimum number of samples. For example, it may be desired to take 16,000 samples, but at least 4,000 samples will be deemed sufficient when 16,000 samples are not taken (for instance, because there are fewer than 16,000 rows in the partition). Where there are not enough samples, the process flow may move to operation 46, where the partition is split logically. Where there are enough samples, the process flow moves to operation 210.

Operation 210 depicts determining whether the samples are skewed—whether less than a threshold percentage of the samples is on one side of the logical midpoint of the partition. In embodiments, this may comprise determining that no more than a predetermined number of samples have a value that is greater than or less than the logical median value of the partition (the median of the values that the hash and range value pairs may span). This skew may also be expressed as whether the median of the samples is within a predetermined number of rows of the logical median row of the partition. For instance, using the partition with a range of [0,600), the logical midpoint is 300. If less than a threshold percentage of samples fall either below or above 300, the partition may be considered to be skewed. Let an example threshold percentage be 33% and there be 10,000 samples. If there are fewer than 3,333 samples found either between 0 and 499, or between 300 and 599, then the partition is considered to be skewed by operation 210.

In embodiments, the amount of skew may be determined as follows. The samples may be divided into two groups, separated by the median value (e.g., where the value is 5, samples with a corresponding value of less than 5 may be placed in one group and samples with a corresponding value of at least 5 may be placed into another group. Then each group may be counted—the cardinality of each group may be ascertained. Where the number of samples in each group differs by a predetermined number, then it may be determined that there is skew. For example, if 70% of the samples are in one group and 30% are in the other group, and skew involves the two groups differing by at least 33%, then this difference of 40% in the number of samples in each group may indicate skew.

Where the partition is not skewed, the process flow moves to operation 206, where the partition is split logically. If the partition is skewed, the process flow moves to operation 212, where the partition is split on a median of the sample.

Operation 212 depicts splitting the partition on the median of the sample—such that half the samples are found below the median, and half the samples are found above the median. For instance, using the partition that ranges on [0, 600) from above, let the median of the samples be 100 (half the samples being found between 0 and 100, and half being found between 100 and 599). Then, the partition is split on this median of the samples, creating two partitions with respective ranges of [0, 100) and [100, 600). After operation 212, the process flow moves to operation 214, where it ends.

FIG. 3 depicts an example of logically splitting a partition at its midpoint.

Here, the logical midpoint is a row such that half the rows (plus or minus one row) are found above the midpoint row, and half the rows (plus or minus one row) are found below the midpoint row, with the number of rows above the midpoint row and the number of rows below the midpoint row differing by no more than one. As depicted, partition 300 stores values from three columns—hash values 302, customer value 304, and range 306. Each row in partition 300 contains an entry in each of these three columns. Partition 300 contains hash values 302 in the set of [0,100]. These hash values correspond to customer values 304. The customer values Bjorn, John, and Paul are hashed with a hash function to produce hash values 302, and then the customer values are stored in partition 300 based on their hash value.

As depicted, there are 19 rows in partition 300, such as row 308. A row contains a customer value 304. A row is depicted here as also containing a hash 302, and a range 306 for clarity. In embodiments, a row itself may not contain a hash or range, but rather the hash and range are used to identify the row. There may be an association between the value or values stored in a row and the hash—an entity may apply a hash function to a value and obtain the hash. The range may also be considered to be deterministic, in that it is a mapping between certain values and certain ranges. In partition 300, the logical midpoint is 50, with there being an equal number of values—also 50—below 50 ([0, 49]) and above 50 ([51,100]). 5 of the 19 rows are on one side of the midpoint—the 5 rows with a hash of 80—and 14 of the 19 rows are on the other side of the midpoint—the 14 rows with a hash value of 5 or 18. Despite the rows being unevenly distributed relative to the logical midpoint, in a hash partition, the logical midpoint will be used as the split point for the partition. The midpoint itself—50—may be assigned to either one of the split partitions depending on the embodiment of the invention implemented. In a hash-range partition, the skew will be determined (as depicted in FIGS. 4 and 5), and the skew will be used to determine whether to use the logical midpoint, or the median of a set of samples.

FIG. 4 depicts an example of sampling a hash-range partition. Sampling a hash-range partition may be used to determine the skew of the partition, and thus to determine whether to split the partition via a logical midpoint or via a median of the samples. As depicted, four samples are taken—sample 420, sample 422, sample 424, and sample 426. Three of these samples—sample 420, sample 422, and sample 424—are below the logical midpoint of 50. One of these four samples—sample 426 is above the logical midpoint of 50.

These four samples may be taken randomly, such as via a random number generator used to generate integers that vary over the number of rows in the partition, and generating a separate random number (indicating a row to use as a sample) for each of the number of samples desired. In embodiments, it may be that an attempt to take a desired number of samples is made, but that not even a minimum number of samples can be taken. For instance, there may be fewer rows in the partition than the minimum number of samples, or there may be insufficient processing resources to take the minimum number of samples within a required amount of time.

FIG. 5 depicts an example of splitting a partition at the median of its sampled points. Splitting a partition at the median of its sampled points may be performed when the skew of the samples is below a threshold—the percentage of samples either above of below the median is less than a given number. Given a threshold of 33%, these samples are said to be skewed, because only one of the four samples—25%—is found above the median of 50 (sample 426). Where the samples are skewed, the partition may be split at the median of its sampled points—shown here as the dividing line 540.

Dividing line 540 is the median of the sampled points because half of the samples (samples 420 and 422) are found below dividing line 540 and half of the samples (samples 424 and 426) are found above dividing line 540. There are places to divide the rows such that half the samples are below that row and half the samples are above that row, and in embodiments, these possible dividing lines may be used.

The median of the samples itself may then be assigned to the split with the one row so that there are two rows (the median and one other row) assigned to one split partition, and the same number of rows—two—assigned to the other split partition. Where there are an odd number of rows between the samples on either side of the median, the true median may be used as the split point for the partition, since the same number of rows will be found between each sample on either side of the median and the median itself. The row corresponding to this true median may then be assigned to either split partition, since one split partition will have one more row than the other, regardless of which split partition the row containing the median is assigned to. In some embodiments, the median may be assigned to the split partition that contains the smaller number of rows.

In embodiments, where sampling of the partition occurs, a partition is still not split along range lines within a single hash value. In such a embodiments, it may be that a partition is not split along range lines, and where the partition cannot otherwise be split, then the partition is not split. Take the case of a partition ranging over [0, 600) where the sample median is 100 with some range additionally. It will be determined whether splitting the partition at 100 with no additional range may be done without causing skew above the allowed amount. If this is not possible, it will be determined whether splitting the partition at the next value above the median (100+1=101) may be done without causing skew above the allowed amount is possible. If one of these is possible, it is used as the split point (different embodiments may look first to the smaller possible split point then the higher possible split point, or the higher possible split point and then the smaller possible split point). If neither of these possible split points is within acceptable skew, then the partition is not split.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. Such systems may comprise at least one memory that bears instructions that, upon execution by at least one processor, cause the system to effectuate certain results as described herein.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to non-transitory, volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A non-transitory computer-readable medium for splitting a first database partition bearing computer-executable instructions that, when executed on one or more computers, cause the one or more computers to perform operations comprising:
   determining that an attribute of the first database partition has reached a threshold;
   obtaining a set of samples of hash and range value pairs for a plurality of rows of the first database partition, the hash and range value pairs configured to be used as at least portions of keys to the first database partition, the set of samples of hash and range value pairs for the plurality of rows corresponding to a subset of rows in the first database partition;
   determining a first median value of the set of samples; and
   copying at least one row from the first database partition to a second database partition based at least in part on the first median value;
   determining a second median value of the first database partition, the second median value indicating a median of a set of values over which a key may span for the first database partition, the key comprising at least one hash value and at least one range value;
   dividing the set of samples into a first set of samples and a second set of samples, based at least in part on the second median value;
   determining that a number of samples in the first set of samples and a number of samples in the second set of samples differ by at least a predetermined number; and
   in response to determining that the number of samples in the first set of samples and the number of samples in the second set of samples differ by at least the predetermined number, copying the at least one row from the first database partition to the second database partition based at least in part on the first median value.

2. The non-transitory computer-readable medium of claim 1, wherein determining that the attribute of the first database partition has reached the threshold comprises:
   determining that the first database partition has reached a predetermined size, or that the first database partition has a predetermined rate of operations being performed on it.

3. The non-transitory computer-readable medium of claim 1, further bearing computer-executable instructions that, when executed on the one or more computers, cause the one or more computers to perform operations comprising:
   determining that a third database partition is associated with a key comprising at least one hash value without a corresponding range value;
   determining a third median value that indicates a median of a range over which hash values span in the third database partition; and
   copying at least one row from the third database partition to a fourth database partition based at least in part on the third median value.

4. The non-transitory computer-readable medium of claim 1, further bearing computer-executable instructions that, when executed on the one or more computers, cause the one or more computers to perform operations comprising:
   determining that a third database partition is associated with a key comprising at least one hash value and at least one range value;
   obtaining a third set of samples of hash and range value pairs for a plurality of rows of the third database partition;

determining that a number of samples in the third set of samples is below a predetermined number;

determining a third median value that indicates a median of a set of numbers over which hash and range value pairs span in the third database partition; and in response to determining that the number of samples in the third set of samples is below the predetermined number, copying at least one row from the third database partition to a fourth database partition based at least in part on the third median value.

5. The non-transitory computer-readable medium of claim 1, further bearing computer-executable instructions that, when executed on the one or more computers, cause the one or more computers to perform operations comprising:

determining that a third database partition is associated with a key comprising at least one hash value and at least one range value;

obtaining a third set of samples of hash and range value pairs for a plurality of rows of the third database partition;

determining that a number of samples in the third set of samples is at least as large as a predetermined number;

determining a third median value that indicates a median of a set of numbers over which hash and range value pairs span in the third database partition;

dividing the third set of samples into a fourth set of samples and a fifth set of samples, based on the third median value;

determining that a number of samples in the fourth set of samples and a number of samples in the fifth set of samples differ by at least a predetermined number; and copying at least one row from the first partition to the second partition based at least in part on the third median value.

6. A system for splitting a first database partition, comprising:

at least one memory bearing instructions that, upon execution by at least one processor, cause the system at least to:

in response to determining that a first database partition is associated with a key comprising at least one hash value and at least one range value, sample a plurality of rows in the first database partition;

determine a first median value of the sampled plurality of rows; and split the first database partition based at least in part on the first median value of the sampled plurality of rows being a split point of the first database partition; and in response to determining that the first database partition is associated with a second key comprising the at least one hash value without a corresponding range value, determine a second median value that indicates a median of a set of values over which the at least one hash value spans in the first database partition; and split the first database partition based at least in part on the second median value being a second split point of the first database partition;

determine a third median value that indicates a median of a set of values over which hash and range value pairs span in the first database partition;

divide the sampled plurality of rows into a first set of samples and a second set of samples, based on the third median value;

determine that a number of samples in the first set of samples and a number of samples in the second set of samples differ by at least a predetermined number; and in response to determining that the number of samples in the first set of samples and the number of samples in the second set of samples differ by at least a predetermined number, split the first database partition, based at least in part on the first median value of the sampled plurality of rows being the split point of the first database partition.

7. The system of claim 6, wherein the second key indicates that a hash function is used to determine in which partition of a plurality of database partitions a value is to be stored.

8. The system of claim 6, wherein the at least one memory further bears instructions that, upon execution by the at least one processor, cause the system at least to:

determine that a second database partition is associated with a third key comprising at least one hash value and at least one range value, sample a plurality of rows of the second database partition;

determine that a number of samples in the sampled plurality of rows is below a predetermined number;

determine a fourth median value that indicates a median of a range over which hash and range value pairs span in the second database partition; and split the second database partition, based at least in part on the fourth median value being a split point of the second database partition.

9. The system of claim 6, wherein the at least one memory further bears instructions that, upon execution by the at least one processor, cause the system at least to:

determine that a second database partition is associated with a third key comprising at least one hash value and at least one range value;

sample a plurality of rows of the second database partition;

determine that a number of samples in the sampled plurality of rows is at least as large as a predetermined number;

determine a fourth median value that indicates a median of a range over which hash and range value pairs span in the second database partition;

divide the sampled plurality of rows into a first set of samples and a second set of samples, based on the fourth median value;

determine that a number of samples in the first set of samples and a number of samples in the second set of samples differ by no more than a predetermined number; and split the second database partition, based at least in part on the fourth median value being a split point of the second database partition.

10. The system of claim 9, wherein the second database partition being associated with the third key comprising at least one hash value and at least one range value indicates that at least one hash function and at least one range are used to determine in which partition of a plurality of database partitions a value is to be stored.

11. The system of claim 6, wherein the at least one memory further bears instructions that, upon execution by the at least one processor, cause the system at least to:

determine to split the first database partition in response to at least determining that the first database partition has reached a threshold size.

12. The system of claim 6, wherein the at least one memory further bears instructions that, upon execution by the at least one processor, cause the system at least to:
determine to split the first database partition in response to at least determining that the first database partition has a threshold rate of operations being performed on it.

13. The system of claim 6, further comprising:
a plurality of storage devices upon which a plurality of database partitions are stored, the plurality of database partitions comprising the first database partition.

14. The system of claim 6, wherein the instructions that, upon execution by at least one processor, cause the system at least to split the first database partition, based at least in part on the first median value of the sampled plurality of rows being the split point of the first database partition further cause the system at least to:
split the rows of the first database partition among a second database partition and a third database partition.

15. The system of claim 6, wherein the instructions that, upon execution by at least one processor, cause the system at least to split the first database partition, based at least in part on the first median value of the sampled plurality of rows being the split point of the first database partition further cause the system at least to:
split the rows of the first database partition among the first database partition and a second database partition.

16. A method, comprising:
sampling a plurality of rows in a first database partition to form a sampled subset of the plurality of rows;
determining a first median value of the sampled subset of the plurality of rows; and
splitting the first database partition, based at least in part on the first median value of the sampled subset of the plurality of rows being a split point of the first database partition;
determining a second median value that indicates a median of a set of values over which hash and range value pairs span for the first database partition;
dividing the sampled plurality of rows into a first set of samples and a second set of samples, based on the second median value;
determining that a number of samples in the first set of samples and a number of samples in the second set of samples differ by at least a predetermined number; and
in response to determining that the number of samples in the first set of samples and the number of samples in the second set of samples differ by at least the predetermined number, based at least in part on the first median value of the sampled plurality of rows being the split point of the first database partition.

17. The method of claim 16, further comprising:
determining that a second database partition is associated with a key comprising the at least one hash value without a corresponding range value; and
splitting the second database partition, based at least in part on a logical median of a set of values over which the key associated with the second database partition may span being a split point of the second database partition.

18. The method of claim 16, further comprising:
determining that a second database partition is associated with a second key comprising at least one hash value and at least one range value;
sampling a plurality of rows of the second database partition;
determining that a number of samples in the sampled plurality of rows is below a predetermined number; and
splitting the second database partition, based at least in part on a logical median of a set of values over which of the second key of the second database partition may span being a split point of the second database partition.

19. The method of claim 16, further comprising:
determining that a second database partition is associated with a second key comprising at least one hash value and at least one range value;
sampling a second plurality of rows of the second database partition;
determining that a number of samples in the second sampled plurality of rows is at least as large as a predetermined number;
determining a third median value that indicates a median of a set of values over which hash and range value pairs span for the second database partition;
determining that no more than a predetermined number of rows in the sampled plurality of rows have a value that is greater than or less than the third median value; and
splitting the second database partition, based at least in part on the third median value of the second database partition being a split point of the second database partition.

20. The method of claim 16, wherein splitting the first database partition comprises:
splitting the first database partition among a first computer and a second computer.

21. The method of claim 16, wherein sampling the plurality of rows in the first database partition:
sampling the plurality of rows in the database partition randomly.

22. The method of claim 16, further comprising:
determining to split the first database partition in response to receiving an indication to split the first database partition determined from user input.

23. The method of claim 22, wherein the indication to split the first database partition determined from user input comprises a Hypertext Transfer Protocol (HTTP) or Hypertext Transfer Protocol Secure (HTTPS) uniform resource locator (URL) that identifies a server in a hostname portion of the URL and the indication to split in a query string of the URL.

24. The method of claim 16, wherein sampling the plurality of rows in the first database partition comprises:
attempting to sample a first number of rows for the sampled plurality of rows; and
determining that a number of the sampled plurality of rows is at least a second number of rows, the first number of rows being greater than the second number of rows.

25. The non-transitory computer-readable medium of claim 1, wherein the wherein obtaining the set of samples comprises random sampling.

26. The non-transitory computer-readable medium of claim 1, wherein the set of samples is evenly distributed within a tolerance.

27. The system of claim 6, wherein the instructions that, upon execution by the at least one processor, cause the system at least to sample a plurality of rows in the first database partition comprises random sampling.

* * * * *